(12) United States Patent
Luyks

(10) Patent No.: US 9,267,480 B1
(45) Date of Patent: Feb. 23, 2016

(54) ELECTRICAL POWER GENERATING ENGINE FLYWHEEL WITH ACTIVE TORQUE CONTROL

(71) Applicant: The Boeing Company, Chicago, IL (US)

(72) Inventor: Leo John Luyks, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 13/891,326

(22) Filed: May 10, 2013

(51) Int. Cl.
| | |
|---|---|
| B60L 9/00 | (2006.01) |
| F02N 11/04 | (2006.01) |
| F02N 11/08 | (2006.01) |
| H02K 23/52 | (2006.01) |

(52) U.S. Cl.
CPC ............ F02N 11/04 (2013.01); F02N 11/0859 (2013.01); H02K 23/52 (2013.01)

(58) Field of Classification Search
CPC ....................................................... H02K 7/02
USPC .................................... 123/149 D; 290/38 B
See application file for complete search history.

(56) References Cited

U.S. PATENT DOCUMENTS

| | | | | |
|---|---|---|---|---|
| 1,463,958 | A * | 8/1923 | Kettering | 123/149 D |
| 3,405,293 | A * | 10/1968 | Burkett et al. | 310/74 |
| 3,497,706 | A * | 2/1970 | Burkett et al. | 290/31 |
| 4,626,696 | A * | 12/1986 | Maucher et al. | 290/38 R |
| 4,695,261 | A * | 9/1987 | Broughton et al. | 440/61 R |
| 4,859,886 | A * | 8/1989 | Tanaka et al. | 310/51 |
| 4,946,526 | A | 8/1990 | Petty-Galis et al. | |
| 5,461,289 | A * | 10/1995 | Adler et al. | 318/139 |
| 5,582,069 | A * | 12/1996 | Genise | 74/335 |
| 5,620,392 | A * | 4/1997 | Genise | 477/120 |
| 5,773,904 | A * | 6/1998 | Schiebold et al. | 310/92 |
| 5,789,881 | A * | 8/1998 | Egami et al. | 318/139 |
| 6,052,638 | A | 4/2000 | Genise | |
| 6,487,998 | B1 * | 12/2002 | Masberg et al. | 123/192.1 |
| 6,598,469 | B2 * | 7/2003 | Shimoyama et al. | 73/114.24 |
| 6,699,081 | B1 * | 3/2004 | Divljakovic et al. | 440/1 |
| 6,995,477 | B2 * | 2/2006 | Fan | 290/1 A |
| 7,028,795 | B2 * | 4/2006 | Tabata | 180/65.21 |
| 7,059,116 | B2 * | 6/2006 | Kusada et al. | 60/285 |
| 7,126,234 | B2 * | 10/2006 | Fan | 290/40 A |
| 7,518,344 | B2 * | 4/2009 | Sihler | 322/58 |
| 2001/0011050 | A1 * | 8/2001 | Yamaguchi et al. | 477/3 |

(Continued)

FOREIGN PATENT DOCUMENTS

| | | | |
|---|---|---|---|
| DE | 2823225 | A * | 11/1979 |
| EP | 2508329 | A1 | 10/2012 |

(Continued)

OTHER PUBLICATIONS

DE 2823225 A Computer Translation, Mar. 26, 2015.*

(Continued)

*Primary Examiner* — Joseph Waks
(74) *Attorney, Agent, or Firm* — Yee & Associates, P.C.

(57) ABSTRACT

A system and method for controlling a power system. A rotor is attached to a crankshaft of an engine. A stator is positioned with respect to the rotor such that the rotor and the stator together form an electric generator for generating electrical power when the rotor is rotated. An electrical current in the electric generator is controlled to control mechanical power provided by the crankshaft when the engine is running.

19 Claims, 7 Drawing Sheets

(56) References Cited

U.S. PATENT DOCUMENTS

| | | | |
|---|---|---|---|
| 2002/0112536 A1* | 8/2002 | Shimoyama et al. | 73/117.3 |
| 2007/0114082 A1* | 5/2007 | Nozaki et al. | 180/65.6 |
| 2012/0083386 A1* | 4/2012 | Vogt et al. | 477/5 |
| 2015/0051762 A1* | 2/2015 | Banker et al. | 701/22 |

FOREIGN PATENT DOCUMENTS

| | | | | | |
|---|---|---|---|---|---|
| GB | 2168203 | A | * | 6/1986 | H02K 7/02 |
| JP | 61061932 | A | * | 3/1986 | |
| JP | 01190922 | A | * | 8/1989 | |
| JP | H026107 | A | | 1/1990 | |

OTHER PUBLICATIONS

Schaible et at., "A Torque Controlled High Speed Flywheel Energy Storage System for Peak Power Transfer in Electric Vehicles," Industry Application Society Annual Meeting, Oct. 1994, pp. 435-442.

International Search Report and Written Opinion, dated Oct. 16, 2014, regarding Application No. PCT/US2014/042467, 11 pages.

Canadian Intellectual Property Office Examination Search Report, dated Jun. 9, 2015, regarding U.S. Pat. No. 2,846,974, 4 pages.

* cited by examiner

ELECTRICAL POWER GENERATING ENGINE FLYWHEEL WITH ACTIVE TORQUE CONTROL

BACKGROUND INFORMATION

1. Field

The present disclosure relates generally to flywheels for reciprocating engines, starters for such engines, and electrical power generators that may be driven by such engines. More particularly, the present disclosure relates to a flywheel apparatus that may also function as an electrical power generator and a starter for an engine, and a system and method for controlling a power system including such a flywheel generator.

2. Background

A flywheel is a rotating mechanical device that is used to store rotational energy. Flywheels may be used to provide continuous energy in systems where the energy source is not continuous. In such cases, the flywheel stores energy when torque is applied by the energy source and the flywheel releases stored energy when the energy source is not applying torque to the flywheel.

For example, a flywheel may be mounted on the crankshaft of a reciprocating engine to maintain constant angular velocity of the crankshaft. The crankshaft is the part of an engine that translates reciprocating linear piston motion into rotation. In this case, the flywheel stores energy when torque is exerted on the crankshaft by a firing piston. The flywheel releases energy to mechanical loads connected to the crankshaft when no piston is exerting torque on the crankshaft.

A starter is a device for rotating an internal-combustion engine so as to start operation of the engine under its own power. For example, an electric starter motor may be used as a starter for gasoline and diesel internal-combustion engines. The electric starter motor may be an electric motor with a starter solenoid mounted on it. When current from a starting battery is applied to the solenoid, the solenoid may engage a lever that pushes out a drive pinion on the driveshaft of the starter motor and meshes the pinion with a starter ring gear on the flywheel of the engine. The solenoid also closes current contacts for the starter motor, which begins to turn. Once the engine starts, a spring in the solenoid assembly may pull the pinion gear away from the ring gear, and the starter motor stops.

An internal combustion engine may be used to drive an electric generator for the generation of electrical power. The electric generator may be connected to the crankshaft of the engine via a mechanical transmission with a number of gears.

It would be beneficial to have a method and apparatus that takes into account one or more of the issues discussed above, as well as possibly other issues.

SUMMARY

An illustrative embodiment of the present disclosure provides an apparatus comprising a flywheel, a rotor, and a stator. The flywheel is configured to be attached to a crankshaft of an engine such than an axis of rotation of the flywheel is aligned with an axis of rotation of the crankshaft. The rotor is configured to be attached to the flywheel such that an axis of rotation of the rotor is aligned with an axis of rotation of the flywheel. The stator is positioned with respect to the rotor such that the rotor and the stator together form an electric generator for generating electrical power when the rotor is rotated.

Another illustrative embodiment of the present disclosure provides a method for controlling a power system. A rotor is attached to a crankshaft of an engine. A stator is positioned with respect to the rotor such that the rotor and the stator together form an electric generator for generating electrical power when the rotor is rotated. An electrical current in the electric generator is controlled to control mechanical power provided by the crankshaft when the engine is running.

Another illustrative embodiment of the present disclosure provides an apparatus comprising a rotor, a stator, and a controller. The rotor is configured to be attached to a crankshaft of an internal combustion engine. The stator is positioned with respect to the rotor such that the rotor and the stator together form an electric generator for generating electrical power when the rotor is rotated. The controller is configured to control an electrical current in the electric generator to control mechanical power provided by the engine when the engine is running.

The features, functions, and benefits can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and benefits thereof, will best be understood by reference to the following detailed description of illustrative embodiments of the present disclosure when read in conjunction with the accompanying drawings, wherein:

DETAILED DESCRIPTION

The different illustrative embodiments recognize and take into account a number of different considerations. "A number," as used herein with reference to items, means one or more items. For example, "a number of different considerations" means one or more different considerations.

The different illustrative embodiments recognize and take into account that a conventional flywheel attached to the crankshaft of an engine may be relatively heavy. A heavy flywheel increases the weight of a vehicle in which the engine is installed and thereby may reduce the operating efficiency of the engine and of the vehicle. Therefore, a lighter flywheel is desirable.

The different illustrative embodiments also recognize and take into account that existing starter motors and electrical generators are often connected to an engine via various mechanical transmission structures and gearing. These mechanical structures may add complexity and weight to an engine and an electrical power generating system. Eliminating or reducing such complexity and weight is desirable.

Therefore, the illustrative embodiments provide a flywheel generator that includes an actively controlled electrical generating motor. A flywheel generator, in accordance with an illustrative embodiment, may replace a traditional flywheel for an engine and may be used for starting the engine as well as removing power in the form of electrical energy.

A flywheel generator in accordance with an illustrative embodiment may include a stationary stator and a rotating rotor of magnetic, iron, steel and equivalent materials. The rotor may be designed for lightness of weight. Active flywheel torque control may be employed to extract maximum electrical energy at desired operating points while ensuring sufficient rotational energy in the engine to maintain reciprocating engine operation.

Figure 1:
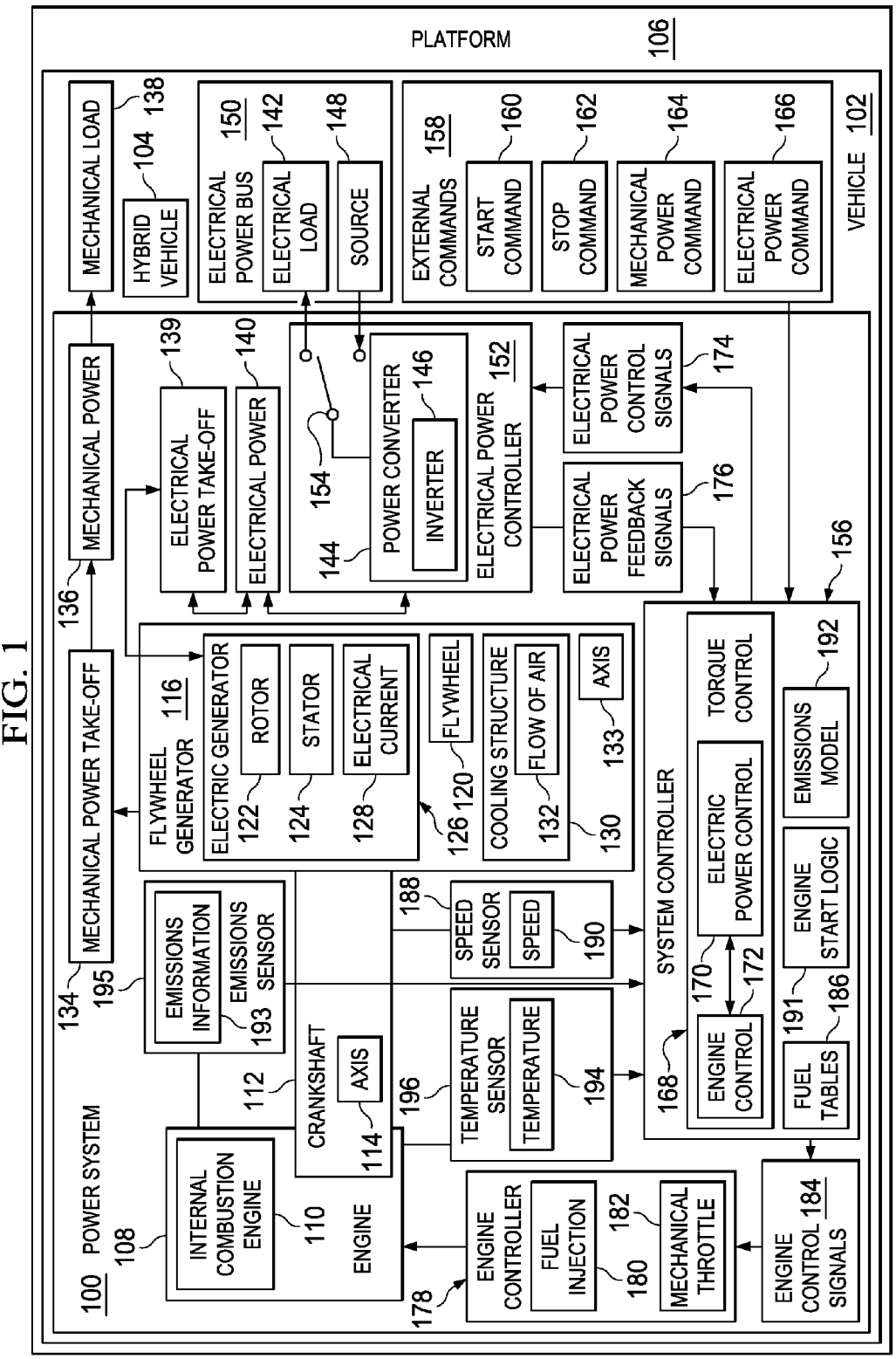
FIG. 1 is an illustration of a block diagram of a power system including a flywheel generator in accordance with an illustrative embodiment.

Turning now to FIG. 1, an illustration of a block diagram of a power system including a flywheel generator is depicted in accordance with an illustrative embodiment. Power system 100 is configured to generate both mechanical power and electrical power.

Power system 100 may be configured to provide mechanical and electrical power for vehicle 102. Vehicle 102 may include any type of vehicle that may be configured for moving through any type of medium or combination of mediums. For example, without limitation, vehicle 102 may include an aircraft, a water craft, a submarine, a locomotive for a train, a bus, an automobile, or any other type of vehicle.

For example, without limitation, vehicle 102 may be hybrid vehicle 104. Hybrid vehicle 104 may include any vehicle that uses two or more distinct power sources to move the vehicle. In particular, hybrid vehicle 104 may be a hybrid electric vehicle which uses an internal combustion engine and one or more electric motors to provide power to move the vehicle.

Vehicle 102 may be an example of platform 106 for which power system 100 provides mechanical and electrical power. Power system 100 may be configured to provide power for platform 106 other than vehicle 102. Platform 106 may include any fixed or mobile platform for which power may be provided by power system 100.

Power system 100 may include engine 108. Engine 108 may be internal combustion engine 110. For example, without limitation, engine 108 may be a diesel engine, a gasoline engine, or an engine that uses any other fuel or combination of fuels. In any case, engine 108 may be a reciprocating engine. In a reciprocating engine, the mechanical power provided by the engine is pulsed rather than continuous.

Engine 108 may include crankshaft 112. Crankshaft 112 is the part of engine 108 that translates reciprocating linear piston motion in engine 108 into rotational motion. Rotation of crankshaft 112 may be about axis 114. Axis 114 may be referred to as the axis of rotation for crankshaft 112.

Power system 100 also may include flywheel generator 116. Flywheel generator 116 may include flywheel 120, rotor 122, and stator 124.

Flywheel 120 may be configured to be attached to crankshaft 112 of engine 108. Flywheel 120 may also be attached to crankshaft 112 in any appropriate manner such that flywheel 120 is rotated by the rotation of crankshaft 112. Flywheel 120 may be made of any appropriate material and may be of any appropriate size. In accordance with an illustrative embodiment, flywheel 120 may be lighter than conventional flywheels used for engines similar to engine 108 in similar applications.

Rotor 122 also may be configured to be attached to crankshaft 112 of engine 108. Rotor 122 may be attached to crankshaft 112 in any appropriate manner such that rotor 122 is rotated by the rotation of crankshaft 112. For example, without limitation, rotor 122 may be attached to flywheel 120 which, in turn, is attached to crankshaft 112.

Stator 124 may be positioned with respect to rotor 122 in any appropriate manner such that stator 124 and rotor 122 together form electric generator 126. For example, without limitation, rotor 122 may be positioned around stator 124. Stator 124 and rotor 122 may be implemented in any appropriate form and any appropriate materials may be used to form electric generator 126. For example, without limitation, stator 124 and rotor 122 may be implemented using any appropriate combination of magnets and wire windings to implement electric generator 126.

Electric generator 126 may be configured to produce electrical current 128 when rotor 122 is rotated. Electric generator 126 also may be configured to operate as an electric motor. For example, rotor 122 may be rotated by providing electrical current 128 to electric generator 126. Rotational force applied to rotor 122 by electric generator 126 may be controlled by controlling electrical current 128 in electric generator 126.

Flywheel generator 116 may include cooling structure 130. Cooling structure 130 may include any appropriate structure for cooling electric generator 126. For example, cooling structure 130 may be configured to increase flow of air 132 through electric generator 126. Cooling structure 130 may be attached to crankshaft 112 of engine 108 in any appropriate manner such that cooling structure 130 is rotated by the rotation of crankshaft 112. For example, without limitation, cooling structure 130 may be attached to rotor 122. In this example, cooling structure 130 may be configured such that when rotor 122 is rotated, flow of air 132 through electric generator 126 is increased to cool electric generator 126.

Flywheel 120, rotor 122, and cooling structure 130 may be connected together and configured to rotate together about common axis 133. Therefore, axis 133 may be referred to as the axis of rotation of flywheel 120, the axis of rotation of rotor 122, the axis of rotation of cooling structure 130, the axis of electric generator 126, and the axis of flywheel generator 116. Flywheel generator 116 may be attached to crankshaft 112 such that axis 133 of flywheel generator 116 is aligned with axis 114 of crankshaft 112. For example, without limitation, flywheel generator 116 may be attached directly to crankshaft 112 such that rotation of crankshaft 112 turns flywheel 120, rotor 122, and cooling structure 130, and vice versa, without any intervening mechanical transmission components or gears between crankshaft 112 and flywheel generator 116.

Mechanical power take-off 134 may include any appropriate structure for providing mechanical power 136 from power system 100 to mechanical load 138. Mechanical power take-off 134 may be mechanically connected to crankshaft 112 in any appropriate manner. For example, without limitation, mechanical power take-off 134 may be mechanically connected to a rotating component of flywheel generator 116, such as flywheel 120.

Electrical power take-off 139 may include any appropriate structure for drawing electrical power 140 from flywheel generator 116 and for providing electrical power 140 to flywheel generator 116. For example, without limitation, electrical power take-off 139 may comprise a number of wires connected to electric generator 126 for conducting electrical current 128 to and from electric generator 126. Electrical power take-off 139 may be connected to rotor 122 or stator 124 of electric generator 126. For example, electric generator 126 may be configured to produce electrical current 128 in stator 124 in response to rotation of rotor 122. In this example, electrical power take-off 139 may be connected to stator 124 of electric generator 126. Brushes or another appropriate structure or combination of structures may be used to connect electrical power take-off 139 to rotor 122 of electric generator 126.

Flywheel generator 116 may be configured to provide alternating current (AC) electrical power 140 on electrical power take-off 139. For example, electric generator 126 may be configured to provide single-phase or multiple-phase AC power. For example, without limitation, flywheel generator 116 may provide three-phase electrical power 140 on electrical power take-off 139.

Electrical power 140 from flywheel generator 116 may be provided to electrical load 142. For example, electrical power 140 may be provided from flywheel generator 116 to electrical load 142 via power converter 144. Power converter 144 may include any appropriate device or combination of devices for converting electrical power 140 on electrical power take-off 139 to electrical power that is appropriate for electrical load 142. For example, without limitation, power converter 144 may be configured to convert AC power on electrical power take-off 139 to direct current (DC) power for electrical load 142.

Power converter 144 may include inverter 146. Inverter 146 may be configured to convert electrical power from source 148 to appropriate electrical power 140 that may be applied to electric generator 126 to control the torque applied to crankshaft 112 by flywheel generator 116. For example, without limitation, inverter 146 may be controlled to provide appropriate electrical power 140 to electric generator 126 to start engine 108.

Source 148 may be any appropriate source of electrical power 140. For example, without limitation, source 148 may be a battery, power line, or any other source or combination of sources of electrical power 140.

Electrical load 142 may be connected to power converter 144 by electrical power bus 150. Source 148 also may be connected to power converter 144 by electrical power bus 150. Power converter 144, thus, may be configured to provide electrical power 140 to electrical power bus 150 and to draw electrical power 140 from electrical power bus 150 as needed.

Power converter 144 may be controlled by electrical power controller 152. Electrical power controller 152 may include any appropriate control device or system that may be configured to control power converter 144 to control the amount of electrical power 140 provided to or drawn from electrical power bus 150. Electrical power controller 152 may be configured to switch power converter 144 between providing electrical power 140 to electrical load 142 and drawing electrical power 140 from source 148. For example, without limitation, switch 154 may be implemented by switching devices in power converter 144 controlled by electrical power controller 152.

Mechanical power 136 provided by power system 100 and electrical power 140 provided or drawn by power system 100 may be controlled by system controller 156. For example, system controller 156 may be configured to control power system 100 in response to external commands 158. System controller 156 may be configured to receive external commands 158 as signals from outside of power system 100 in any appropriate form.

For example, without limitation, external commands 158 may include start command 160, stop command 162, mechanical power command 164, electrical power command 166 or any other appropriate command or combination of commands that may originate from outside of power system 100. Start command 160 may indicate that engine 108 is to be started. Stop command 162 may indicate that engine 108 is to be stopped. Mechanical power command 164 may identify an amount of mechanical power 136 demanded from, and to be provided by, power system 100. Electrical power command 166 may identify an amount of electrical power 140 demanded from, and to be provided by, power system 100.

System controller 156 may be configured to provide appropriate torque control 168 in response to external commands 158. Torque control 168 may be implemented by electric power control 170 and engine control 172. The processes of electric power control 170 and engine control 172 may be integrated to provide torque control 168.

Electric power control 170 may be configured to control electrical current 128 in electric generator 126. For example, electrical current 128 in electric generator 126 may be controlled by controlling the operation of power converter 144. In this case, electric power control 170 may include providing appropriate electrical power control signals 174 from system controller 156 to electrical power controller 152 to control operation of power converter 144 in an appropriate manner.

System controller 156 may use appropriate electrical power feedback signals 176 for electric power control 170. For example, electrical power feedback signals 176 may be provided to system controller 156 from power converter 144 or any other appropriate location or combination of locations in any appropriate manner and form.

Engine control 172 may be configured to control the operation of engine 108. For example, engine control 172 may be configured to control the speed or other characteristics or combinations of characteristics of operation of engine 108.

Engine control 172 may include controlling the flow of fuel to engine 108. The flow of fuel to engine 108 may be controlled by engine controller 178. For example, engine controller 178 may include any appropriate device or system for controlling fuel injection 180 for engine 108. Alternatively, engine controller 178 may be configured to control mechanical throttle 182 for engine 108. In this case, engine control 172 may include providing appropriate engine control signals 184 from system controller 156 to engine controller 178 to control operation of engine 108 in an appropriate manner.

System controller 156 may be configured to use appropriate feedback signals from engine 108 and fuel tables 186 to generate appropriate engine control signals 184 for engine control 172. For example, speed sensor 188 may be configured to provide feedback indicating speed 190 of engine 108 to system controller 156. Speed sensor 188 may include any appropriate system or device for providing feedback of speed 190 to system controller 156. For example, without limitation, speed sensor 188 may be coupled to crankshaft 112 of engine 108 or to any other appropriate location on engine 108 or flywheel generator 116.

System controller 156 may be configured to use engine start logic 191 to start engine 108 in response to receiving start command 160. For example, without limitation, engine start logic 191 may be used by system controller 156 to generate an appropriate sequence of electrical power control signals 174 and engine control signals 184 to start engine 108.

System controller 156 may be configured to control emissions by engine 108. For example, system controller 156 may be configured to use emissions model 192 and appropriate feedback from engine 108 to control emissions by engine 108 in an appropriate manner. For example, without limitation, feedback that may be used for emissions control of engine 108 may include emissions information 193, feedback identifying temperature 194 of engine 108, or any other appropriate feedback information or combination of feedback information. Emissions information 193 may be provided by any appropriate emissions sensor 195 associated with engine 108. Temperature 194 of engine 108 may be provided by any appropriate temperature sensor 196. Temperature sensor 196 may be positioned at any appropriate location on engine 108.

The illustration of FIG. 1 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different embodiments.

For example, all or part of electrical power controller 152, engine controller 178, or both may be implemented as part of system controller 156.

Figure 2:
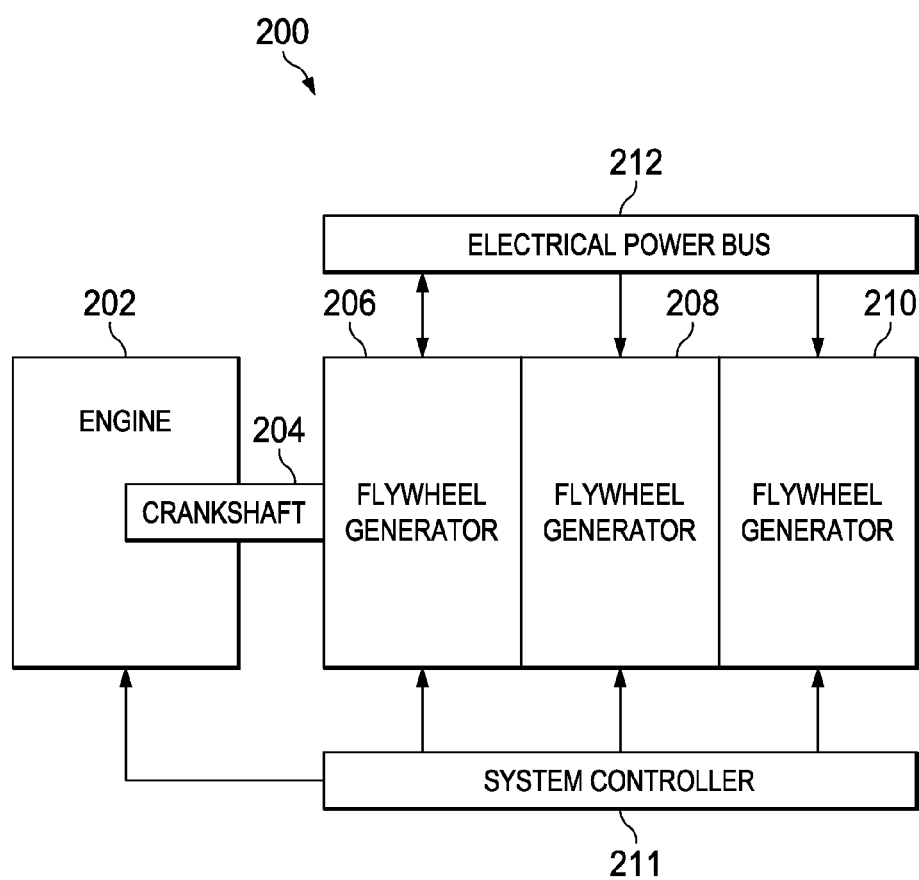
FIG. 2 is an illustration of a block diagram of a power system comprising a plurality of flywheel generators in accordance with an illustrative embodiment.

Turning now to FIG. 2, an illustration of a block diagram of a power system comprising a plurality of flywheel generators is depicted in accordance with an illustrative embodiment. In this example, power system 200 is an example of one implementation of power system 100 in FIG. 1.

Power system 200 may include engine 202 with crankshaft 204. In this example, engine 202 may be an example of one implementation of engine 108 in FIG. 1.

Power system 200 also may include a plurality of flywheel generators. For example, flywheel generator 206, flywheel generator 208, and flywheel generator 210 may be attached to crankshaft 204 of engine 202. In this example, flywheel generators 206, 208, and 210 may be examples of flywheel generator 116 in FIG. 1. Flywheel generators 206, 208, and 210 may be attached to crankshaft 204 in any appropriate manner. Flywheel generators 206, 208, and 210 may or may not be substantially identical. More or fewer than three flywheel generators may be attached to engine 202 in accordance with an illustrative embodiment.

System controller 211 may be configured to control power system 200. In this example, system controller 211 may be an example of one implementation of system controller 156 in FIG. 1. For example, system controller 211 may be configured to control engine 202 and flywheel generators 206, 208, and 210 to control the mechanical power provided by power system 200 and to control the electrical power provided to and drawn from electrical power bus 212 by power system 200.

Figure 3:
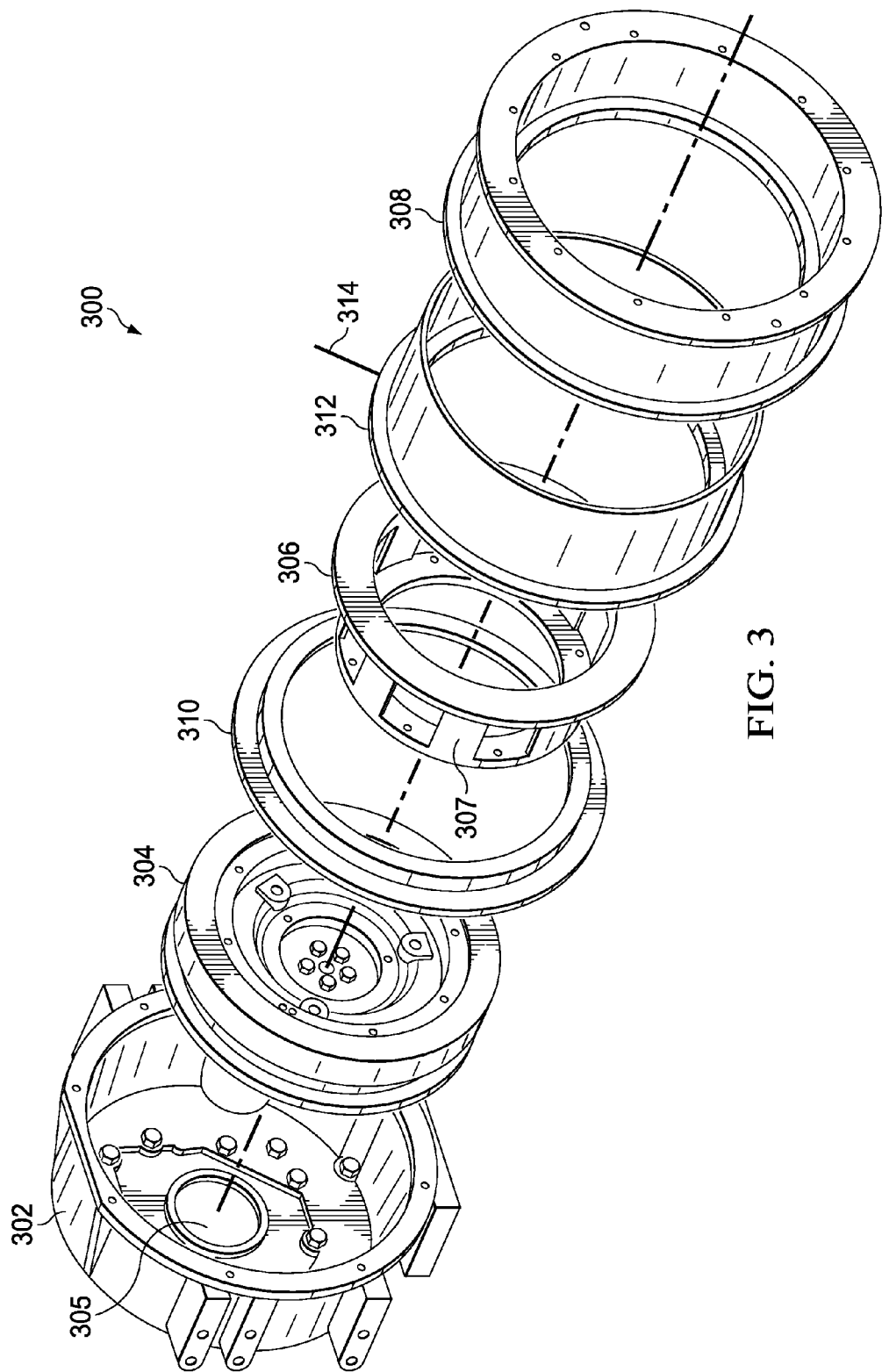
FIG. 3 is an illustration of an exploded perspective view of a flywheel generator in accordance with an illustrative embodiment.

Turning now to FIG. 3, an illustration of an exploded perspective view of a flywheel generator is depicted in accordance with an illustrative embodiment. In this example, flywheel generator 300 may be an example of one implementation of flywheel generator 116 in FIG. 1.

For example, without limitation, flywheel generator 300 may include housing 302. Housing 302 may be configured to be attached to an engine in any appropriate manner.

Flywheel 304 may be configured to be attached to the crankshaft of the engine. For example, flywheel 304 may be configured to be attached to the crankshaft via aperture 305 in housing 302.

Cooling structure 306 may be configured to be attached to flywheel 304. For example, cooling structure 306 may be configured with blades 307 or other appropriate structures for increasing air flow through flywheel generator 300 when cooling structure 306 is rotated.

Rotor 308 may be attached to cooling structure 306. Therefore, in this example, rotor 308, cooling structure 306, and flywheel 304 may be configured to rotate together about the same axis of rotation when flywheel 304 is rotated by the crankshaft to which it is attached.

Stator adapter 310 may be attached to housing 302. Stator 312 may be attached to stator adapter 310. In this example, stator 312 may be positioned such that rotor 308 is positioned around stator 312. Electrical power take-off 314 may be provided for drawing electrical power from and providing electrical power to stator 312.

Figure 4:
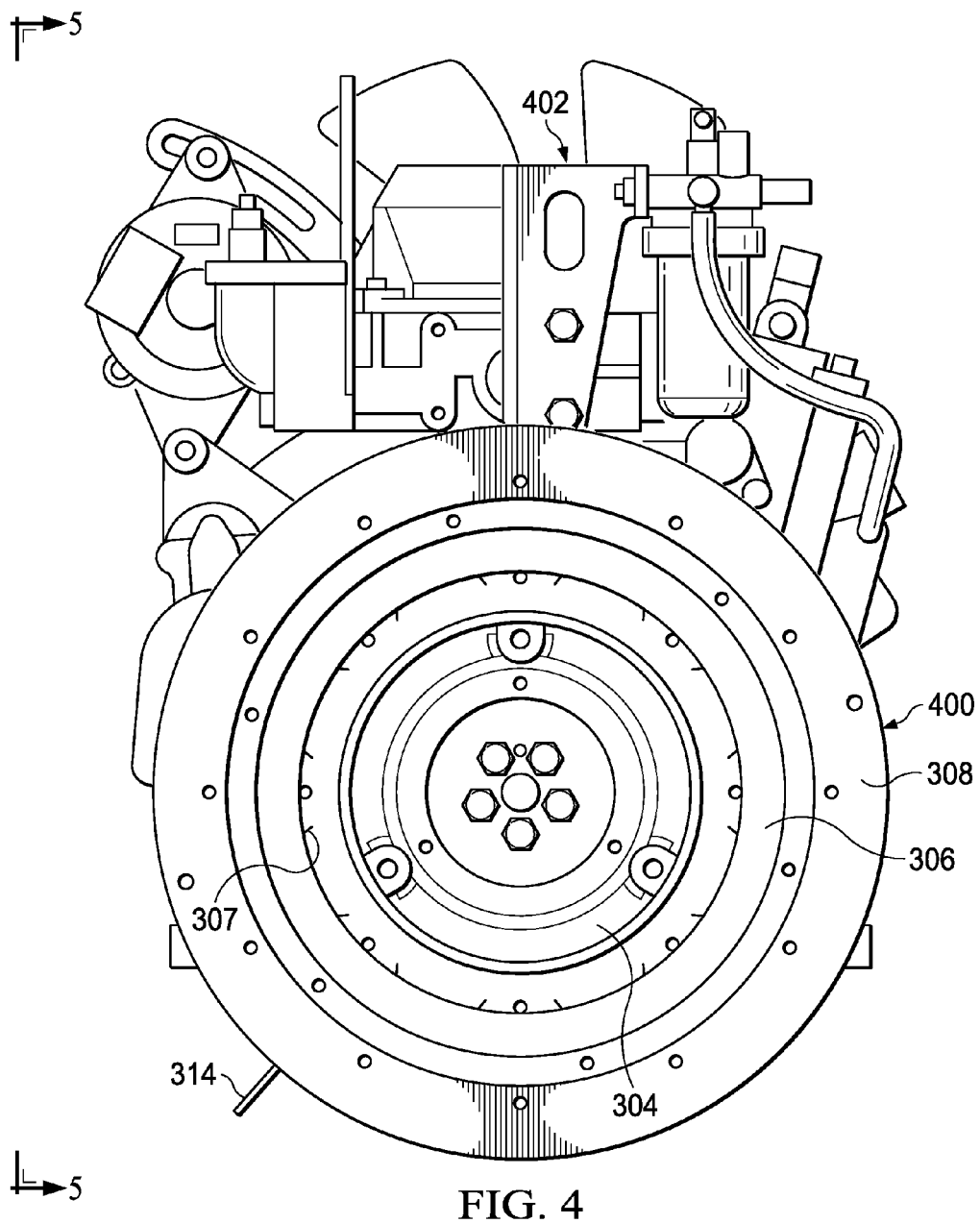
FIG. 4 is an illustration of an end view taken along the axis of rotation of a flywheel generator attached to an engine in accordance with an illustrative embodiment.

Tuning now to FIG. 4, an illustration of an end view taken along the axis of rotation of a flywheel generator attached to an engine is depicted in accordance with an illustrative embodiment. In this example, flywheel generator 400 comprises the components of flywheel generator 300 in FIG. 3. Therefore, the reference numbers for the various components of flywheel generator 300 in FIG. 3 are also used for flywheel generator 400.

In this example, flywheel generator 400 is attached to engine 402. In this view portions of flywheel 304, cooling structure 306, including blades 307, and rotor 308, of flywheel generator 400 are visible. Electrical power take-off 314 is also shown.

Figure 5:
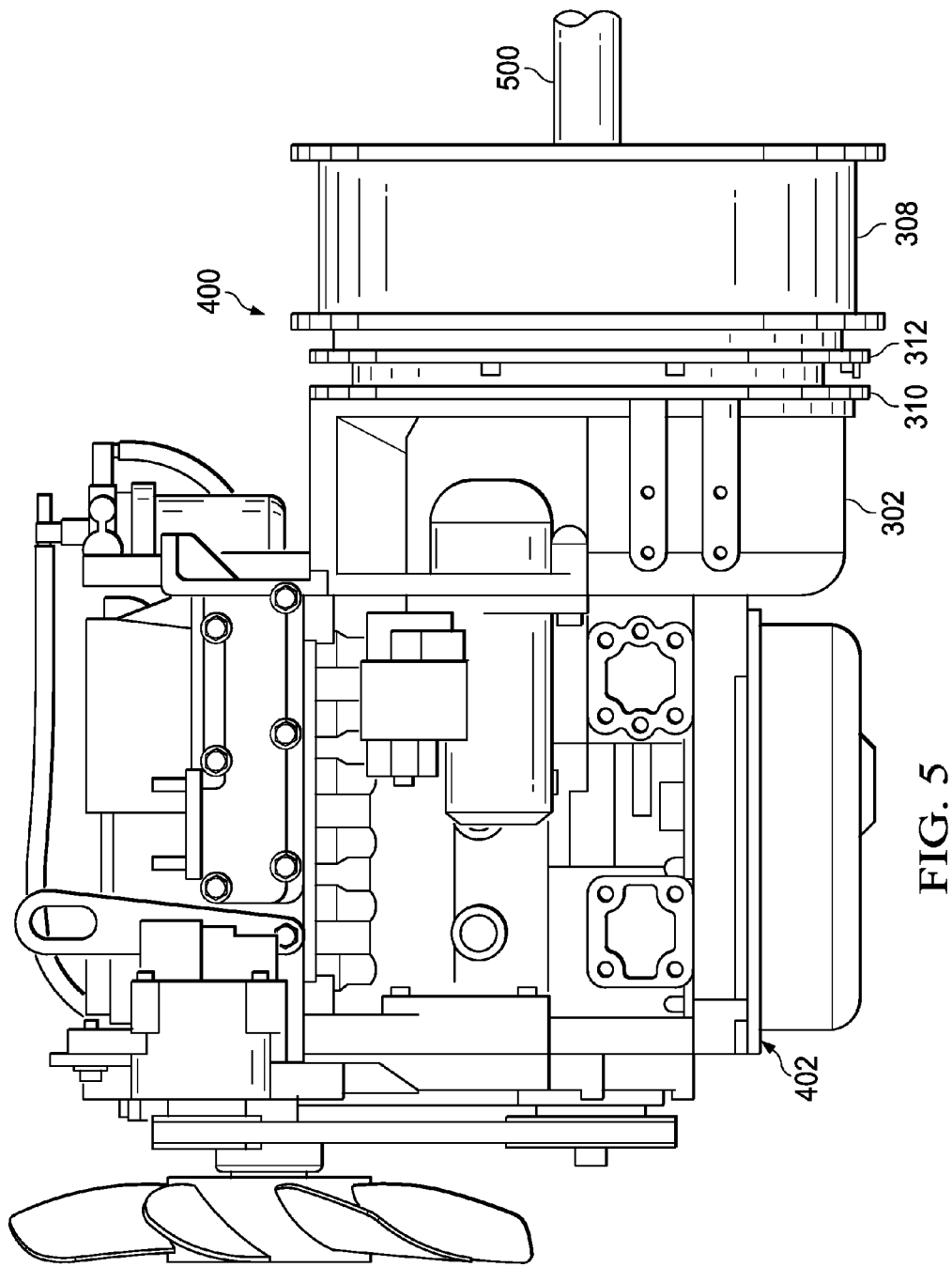
FIG. 5 is an illustration of a side view of the flywheel generator attached to the engine as taken along line 5-5 of FIG. 4 in accordance with an illustrative embodiment.

Turning now to FIG. 5, an illustration of a side view of the flywheel generator attached to the engine as taken along line 5-5 of FIG. 4 is depicted in accordance with an illustrative embodiment. In this view, portions of housing 302, stator adapter 310, stator 312, and rotor 308 of flywheel generator 400 are visible. The position of mechanical power take-off 500 with respect to flywheel generator 400 also is shown.

Figure 6:
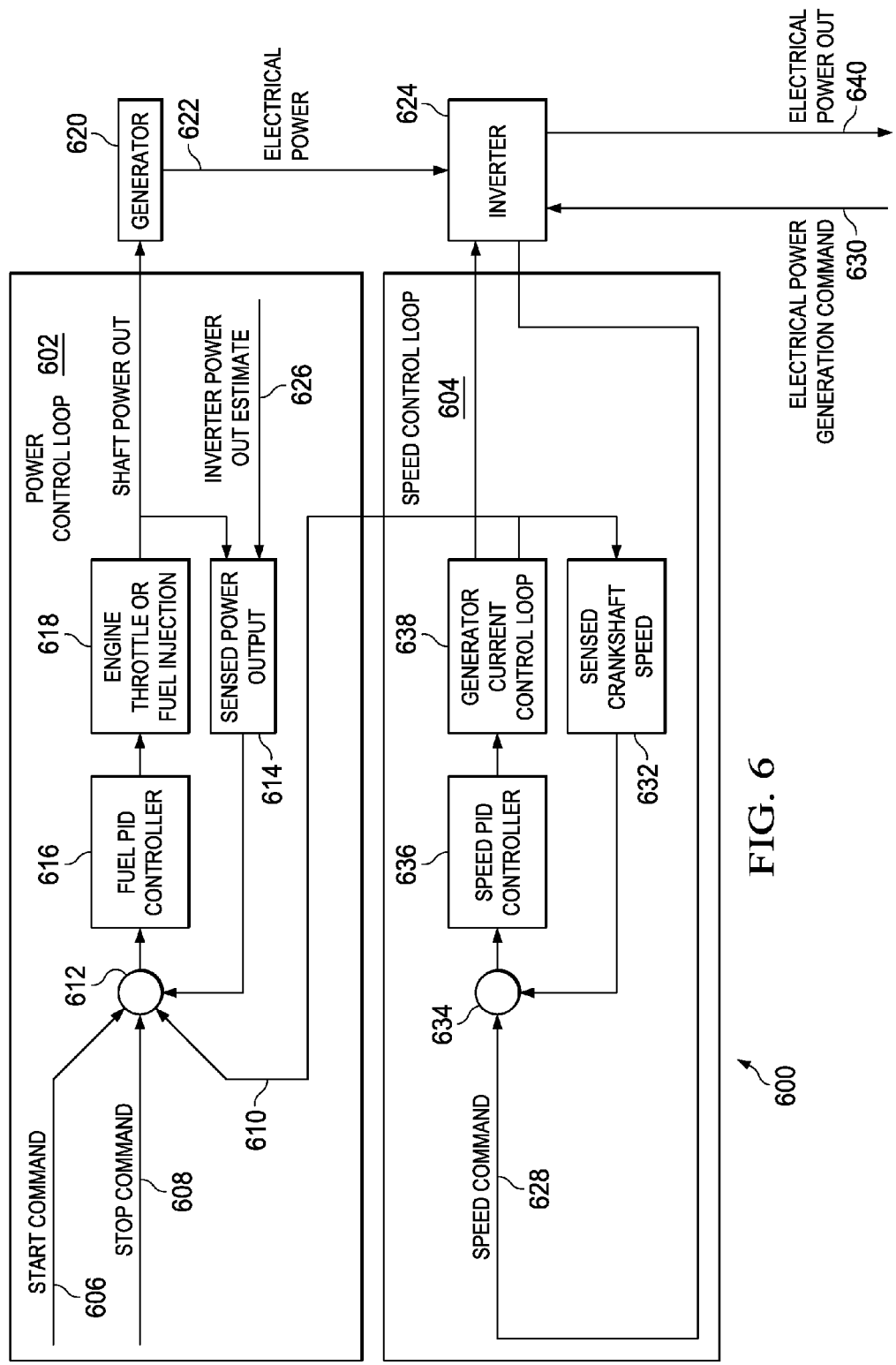
FIG. 6 is an illustration of a block diagram of a control system for a power system including a flywheel generator in accordance with an illustrative embodiment.

Turning now to FIG. 6, an illustration of a block diagram of a control system for a power system including a flywheel generator is depicted in accordance with an illustrative embodiment. Control system 600 may be an example of one implementation of a control system for power system 100 implemented in system controller 156 in FIG. 1. Control system 600 may include power control loop 602 and speed control loop 604.

Inputs to power control loop 602 may include start command 606, stop command 608, and output from speed control loop 604 on line 610. Start command 606, stop command 608, and output from speed control loop 604 on line 610 may be combined at node 612 with sensed power output 614 and provided to fuel PID controller 616. Per industry standard, a PID controller is a controller that may include a proportional term, an integrator term, and a differentiator terms as part of a control loop design. The output of fuel PID controller 616 may be used to control engine throttle or fuel injection 618.

Engine throttle or fuel injection 618 controls the power that will be generated by the crankshaft of the engine to drive generator 620 to produce electrical power 622. Electrical power 622 from generator 620 may be provided to inverter 624. The power generated by the crankshaft of the engine may be sensed and combined with an estimate of the power output by inverter 624 on inverter power out estimate on line 626 to provide sensed power output 614 as feedback to fuel PID controller 616.

Turning now to speed control loop 604, input to speed control loop 604 may include speed command on line 628. Speed command on line 628 may be derived from electrical power generation command 630 provided to inverter 624.

Speed command on line 628 may be combined with sensed crankshaft speed 632 at node 634 and provided to speed PID controller 636.

The output of speed PID controller 636 may be provided as output to generator current control loop 638 for controlling inverter 624 to provide electrical power out 640. The output of generator current control loop 638 is also provided as input to power control loop 602. Therefore, the output of generator current control loop 638 is used to control the speed of the engine crankshaft via power control loop 602. The speed of the engine crankshaft may be sensed to provide sensed crankshaft speed 632 as feedback to speed PID controller 636.

Therefore, the illustrative embodiments provide an electricity generating engine flywheel with active torque control. The illustrative embodiments may be used to replace a traditional flywheel with an active electrical generating motor which can be used for starting an engine as well as removal of power in the form of electrical energy. The flywheel generator may include a stationary stator and rotating rotor of magnetic, iron, steel and equivalent materials. The rotor may be designed for lightness of weight. Active flywheel torque control may be employed to extract maximum electrical energy at desired operating points while ensuring sufficient rotational energy in the engine to maintain reciprocating engine operation.

One or more of the illustrative embodiments provides a capability for embedded electrical energy generation from an internal combustion engine with minimal weight of the flywheel and without mechanical transmission and gearing. The illustrative embodiments remove the need for engine mounted mechanical transmission and gears for electrical power generation. The illustrative embodiments may be used to provide electrical power generation from reciprocating internal combustion engines with light weight and high reliability. The illustrative embodiments are capable of extracting both electrical and mechanical energy at the same time. The illustrative embodiments may provide a lighter weight engine flywheel for reduced engine weight of a generator. The illustrative embodiments also may eliminate the need for an engine mounted starter and alternators, thereby simplifying engine design.

Figure 7:
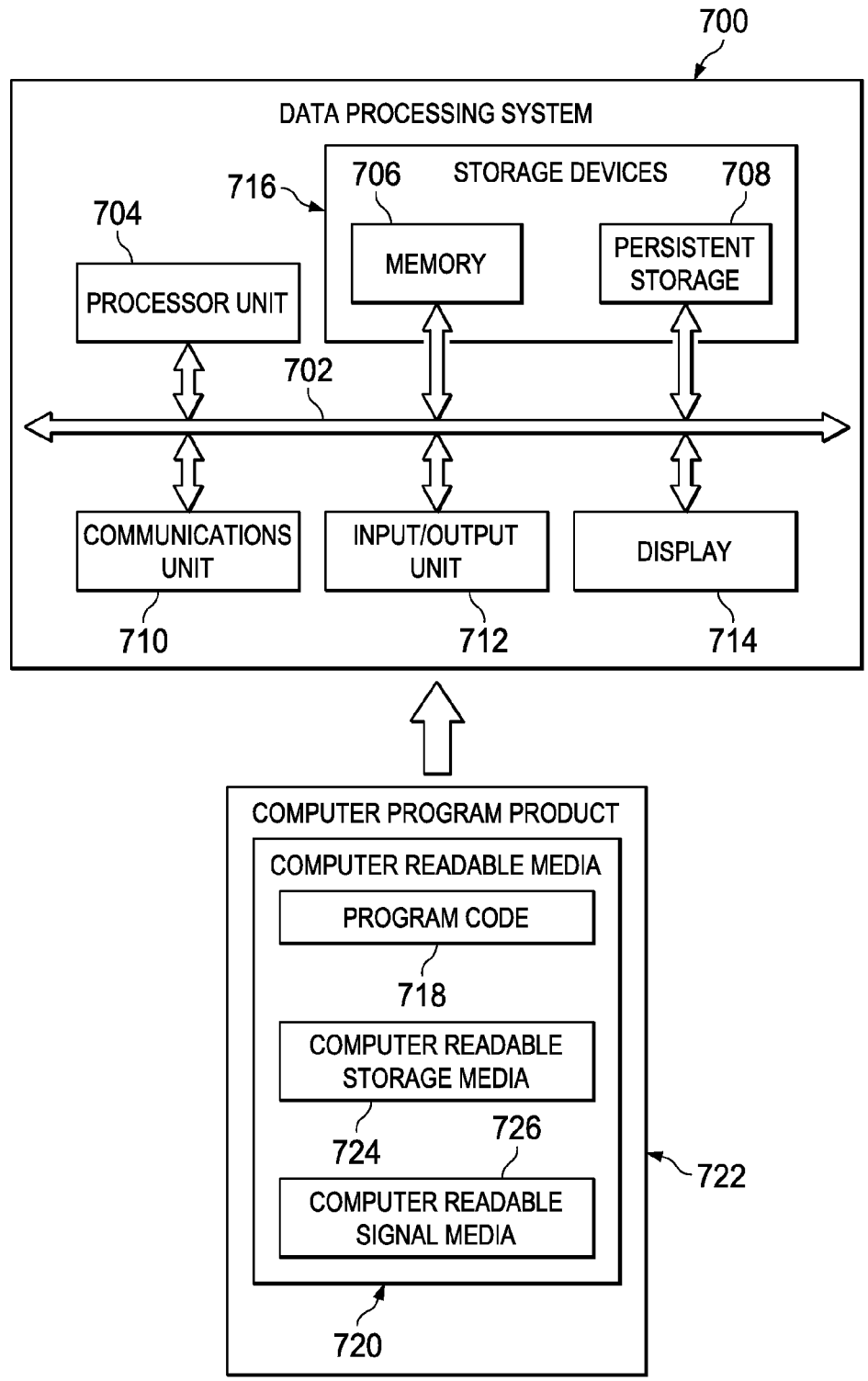
FIG. 7 is an illustration of a block diagram of a data processing system in accordance with an illustrative embodiment.

Turning now to FIG. 7, an illustration of a block diagram of a data processing system is depicted in accordance with an illustrative embodiment. In this example, data processing system 700 is an example of one implementation of a data processing system in which system controller 156 in FIG. 1 may be implemented.

In this illustrative example, data processing system 700 includes communications fabric 702. Communications fabric 702 provides communications between processor unit 704, memory 706, persistent storage 708, communications unit 710, input/output unit 712, and display 714. Memory 706, persistent storage 708, communications unit 710, input/output unit 712, and display 714 are examples of resources accessible by processor unit 704 via communications fabric 702.

Processor unit 704 serves to run instructions for software that may be loaded into memory 706. Processor unit 704 may be a number of processors, a multi-processor core, or some other type of processor, depending on the particular implementation. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer-implemented instructions, which may be located in a memory, such as memory 706.

These instructions are referred to as program instructions, program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700.

In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, or any other suitable type of signal. These signals may be transmitted over communications links, such as wireless communications links, optical fiber cable, coaxial cable, a wire, or any other suitable type of communications link. In other words, the communications link or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code. As one example, data processing system 700 may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system.

Additionally, communications unit 710 may include a number of devices that transmit data, receive data, or transmit and receive data. Communications unit 710 may be, for example, a modem or a network adapter, two network adapters, or some combination thereof. Further, a memory may be, for example, memory 706, or a cache, such as found in an interface and memory controller hub that may be present in communications fabric 702.

The flowcharts and block diagrams in the different depicted embodiments illustrate the structure, functionality, and operation of some possible implementations of apparatuses and methods in different illustrative embodiments. In this regard, each block in the flowcharts or block diagrams may represent a module, segment, function, or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

The description of the different illustrative embodiments has been presented for purposes of illustration and description, and is not intended to be exhaustive or to limit the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus, comprising:
a torque control for a crankshaft of an engine, the torque control comprising:
an electrical power control integrated with an engine control;
the crankshaft directly connected to:
a mechanical power take-off that extends externally from a side of a housing for a flywheel generator, the side being opposite a side of the housing mounted to the engine; and
a rotating component of a flywheel, the flywheel directly attached to the crankshaft such that an axis of rotation of the flywheel is aligned with an axis of rotation of the crankshaft;
a rotor directly connected to:
the flywheel; and
a cooling structure, such that an axis of rotation of the rotor is aligned with the axis of rotation of the flywheel, and the rotor, the flywheel, and the cooling structure rotate together; and a stator positioned with respect to the rotor such that the rotor and the stator together form an electric generator that provides, when a rotation of the crankshaft rotates the rotor, an alternating current to an electrical power take-off connected to a power converter connected to an electrical power bus, such that the electrical power bus comprises a connector to an electrical power source distinct from the electrical power take-off.

2. The apparatus of claim 1, further comprising the rotor positioned around the stator, and the crankshaft directly connected to the flywheel, without any intervening gears, such that, in operation, the crankshaft rotates: the flywheel, the rotor, and the cooling structure, without any intervening gears.

3. The apparatus of claim 1 further comprising, a flow of air, produced by the cooling structure when the cooling structure rotates, across the electric generator, wherein an axis of rotation of the cooling structure aligns with the axis of rotation of the crankshaft.

4. The apparatus of claim 1, further comprising the crankshaft configured such that in operation the crankshaft simultaneously produces both an electrical energy and a mechanical energy, via a power control loop that controls electrical energy generated by the crankshaft, the power control loop comprising: a power output of the crankshaft, an estimate, by an inverter connected to the electrical generator, of the power output, a fuel controller connected to the engine, and an output from a generator current control loop, the output from the generator current control loop being determined by: a speed controller, a speed of the crankshaft, and a speed command from the inverter to the fuel controller based upon an electrical power generation command.

5. The apparatus of claim 4, further comprising, an electrical current in the electric generator controlled by the controller such that the crankshaft rotates and starts the engine.

6. A method for controlling a power system, comprising:
controlling a torque of a crankshaft via integrating a control of an electrical power control and an engine control via;
attaching a rotor to a perimeter of a flywheel directly connected to:
the crankshaft directly connected to a mechanical power take-off of an engine; and
a cooling structure, without any intervening gears, such that the rotor, the flywheel, and the cooling structure rotate together;
positioning a stator with respect to the rotor such that the rotor and the stator together form an electric generator for generating electrical power when the rotor is rotated; and
controlling an electrical current in the electric generator to control mechanical power provided by the crankshaft when the engine is running such that the crankshaft simultaneously produces both an electrical energy and a mechanical energy via a power control loop that controls electrical energy generated by the crankshaft, while ensuring sufficient rotational energy in the engine to maintain reciprocating engine operation when extracting maximum electrical energy available from the electrical generator, the power control loop comprising: a power output of the crankshaft, an estimate, by an inverter connected to the electrical generator, of the power output, a fuel controller connected to the engine, and an output from a generator current control loop, the output from the generator current control loop being determined by: a speed controller, a speed of the crankshaft, and a speed command from the inverter to the fuel controller based upon an electrical power generation command.

7. The method of claim 6, wherein an axis of rotation of the rotor is aligned with an axis of rotation of the crankshaft.

8. The method of claim 7 further comprising attaching the flywheel to the crankshaft such that an axis of rotation of the flywheel is aligned with the axis of rotation of the crankshaft.

9. The method of claim 6 further comprising controlling the electrical current in the electric generator to rotate the crankshaft to start the engine.

10. The method of claim 6 further comprising controlling the engine to control the mechanical power provided by the crankshaft and the electrical power provided by the electric generator.

11. The method of claim 10, wherein controlling the engine comprises controlling fuel injection to the engine.

12. The method of claim 6 further comprising controlling the engine and the electrical current in the electric generator to control emissions by the engine.

13. A torque control machine, comprising:
an integration of an electrical power control and an engine control;
a rotor and a cooling structure, each directly attached to a flywheel directly connected to a crankshaft directly connected a mechanical power take-off of an engine, such that the rotor, the flywheel, and the cooling structure rotate together;
a stator positioned with respect to the rotor such that the rotor and the stator together form an electric generator that generates an electrical power, when the rotor is rotated, to an electrical power take-off connected to a power converter connected to an electrical power bus, such that the electrical power bus comprises a connector to an electrical power source distinct from the electrical power take-off; and
a controller that controls an electrical current in the electric generator to control mechanical power provided by the engine when the engine is running, such that the crankshaft simultaneously produces both an electrical energy and a mechanical energy via a power control loop that controls electrical energy generated by the crankshaft, the power control loop comprising: a power output of the crankshaft, an estimate, by an inverter connected to the electrical generator, of the power output, a fuel controller connected to the engine, and an output from a generator current control loop, the output from the generator current control loop being determined by: a speed controller, a speed of the crankshaft, and a speed command from the inverter to the fuel controller based upon an electrical power generation command.

14. The torque control machine of claim 13, further comprising the rotor attached to the crankshaft such that an axis of rotation of the rotor is aligned with an axis of rotation of the crankshaft.

15. The torque control machine of claim 14 further comprising the flywheel attached to the crankshaft such that an axis of rotation of the flywheel is aligned with the axis of rotation of the crankshaft.

16. The torque control machine of claim 13 further comprising the controller controlling the electrical current in the electric generator to rotate the crankshaft to start the engine.

17. The torque control machine of claim 13, further comprising the controller controlling the engine to control the mechanical power provided by the crankshaft and the electrical power provided by the electric generator.

18. The torque control machine of claim 17, further comprising the controller controlling fuel injection to the engine to control the engine.

19. The torque control machine of claim 13, further comprising the controller controlling the engine and the electrical current in the electric generator to control emissions by the engine.

* * * * *